… …

United States Patent [19]

Colnot

[11] Patent Number: 5,613,159
[45] Date of Patent: Mar. 18, 1997

[54] CONTACT-FREE DATA EXCHANGE BETWEEN A TERMINAL AND MODULAR PORTABLE SET HAVING TWO DIFFERENT PROTOCOLS FOR EXCHANGE WHICH IS SELECTED BASED ON PORTABLE SET TYPE

[75] Inventor: Cedric Colnot, Ivry sur Seine, France

[73] Assignee: Innovatron Industries S.A., Paris, France

[21] Appl. No.: 41,005

[22] Filed: Mar. 31, 1993

(Under 37 CFR 1.47)

[30] Foreign Application Priority Data

Apr. 8, 1992 [FR] France .................... 92 04480

[51] Int. Cl.⁶ .................................................. H01J 3/00
[52] U.S. Cl. ................ 395/831; 395/833; 395/834; 395/836; 235/492
[58] Field of Search .................... 395/275, 200, 395/831, 833, 834, 836; 235/492, 380, 487

[56] References Cited

U.S. PATENT DOCUMENTS

| | | | |
|---|---|---|---|
| 5,149,945 | 9/1992 | Johnson et al. | 235/380 |
| 5,206,495 | 4/1993 | Kreft | 235/492 |
| 5,349,699 | 9/1994 | Iijima | 395/275 |
| 5,375,037 | 12/1994 | Le Koux | 361/684 |
| 5,382,781 | 1/1995 | Inoue | 235/384 |

FOREIGN PATENT DOCUMENTS

| | | |
|---|---|---|
| 0159539 | 3/1985 | European Pat. Off. . |
| 0402182 | 2/1990 | European Pat. Off. . |
| 0401192 | 5/1990 | European Pat. Off. . |
| 0466969 | 7/1990 | European Pat. Off. . |
| 2637710 | 4/1990 | France . |
| 2637749 | 4/1990 | France . |
| 3637684 | 7/1987 | Germany . |

*Primary Examiner*—Thomas C. Lee
*Assistant Examiner*—Sang Hui Kim
*Attorney, Agent, or Firm*—Merchant, Gould, Smith, Edell, Welter & Schmidt, P.A.

[57] ABSTRACT

In a system for data exchanges without physical contact between a generally mobile portable set and a terminal or a population of generally fixed terminals, it is sought to make a modular set comprising a portable object (notably a memory card) that can be inserted either into a transceiver device, or in an ISO reader for by example, by saving on an interface management system and by reducing the power consumption of the set to the minimum. The transceiver device is without any microprocessor, and the portable object houses means for the management notably of the transmission/reception protocol of the portable set and of the ISO 7816-3 protocol.

29 Claims, 5 Drawing Sheets

CONTACT-FREE DATA EXCHANGE BETWEEN A TERMINAL AND MODULAR PORTABLE SET HAVING TWO DIFFERENT PROTOCOLS FOR EXCHANGE WHICH IS SELECTED BASED ON PORTABLE SET TYPE

BACKGROUND OF THE INVENTION

1. Field of the Invention

The field of the invention is that of data exchanges without physical contact, i.e. for example exchanges using RF or infra-red links.

More specifically, the invention relates to a system for data exchanges without physical contact between a generally mobile portable set and a terminal or a population of generally fixed terminals.

The invention has numerous applications such as, for example, the control of "hands free" physical access applicable to the identification of persons seeking to enter a building. In this case, the user is provided with a portable set containing identification data elements. At the entrance to the building, there is a transmission/reception or transceiver terminal. When the user wishes to enter the building and approaches this terminal, the user's portable set goes from a standby or waiting state to an active state so that contact-free dialog is set up between the terminal and the portable set. During this dialog, the terminal recognizes the type of portable set, receives the identification data elements contained in this portable set and permits access to the building if these identification data elements meet the requisite criteria (for example, if the user belongs to a predetermined list of persons).

The invention can also be applied to systems of toll payment without stopping (dynamic or "on-the-fly" toll collection with remote payment) and notably to remote payment in a transport system in an urban built-up area. In this case, payment terminals are located at the different points of access to the transport system. The user who wishes to gain access to these public transport systems approaches a payment terminal which activates his portable set. A dialog, without any physical contact, is set up between the terminal and the portable set. After having checked the validity of the information elements as well as the transport payment credit units contained in the portable set, the terminal records the payment of the transport charge and also records this transaction (recording of the debit) in the memory of the portable set. Thus, the user obtains easy access to the transport system and, when he has used up all his credit units stored in his portable set, he can reload it with transport credit units corresponding to single tickets or season tickets.

Many other applications will easily be envisaged by those skilled in the art.

2. Description of the Prior Art

There is a known portable set that communicates without physical contact, as described in the patent document FR 88 16672 filed on 16 Dec. 1988.

The portable set is herein constituted by a single-piece portable object. This portable set may be, for example, a memory card and comprises notably a microcontroller, a electronic circuit for transmission by induction and a battery. This portable set is designed to work in a configuration of contact-free communication with remote terminals enabling, for example, the implementation of remote payment operations (remote toll collection).

This type of portable set or assembly, which is constituted by a card capable of exchanging data elements without contact with a terminal, has the major drawback of being dedicated to a predetermined type of application.

In other words, it cannot meet a demand and a need for "transversality" or the fulfilling of several functions. This means that it can be used for only one type of application and, for example, cannot be used also, in parallel, as a standard memory card with mechanical coupling means (as a bank card for example).

It is possible to think of providing a portable set like this with physical coupling means in order to permit, in addition to the contact-free communications configuration, another configuration of communication with physical coupling to a terminal enabling, notably, the loading and the reloading of the card with credits or units corresponding to single tickets or season tickets.

However, this "bi-configuration" type of improved version can have only limited functions, unless there is an increase in the complexity of the electronic circuitry integrated into the unit, at the cost of increased energy consumption and hence at the cost of reduced autonomy.

Furthermore, this "bi-configuration" approach requires the designing and marketing of specific portable modules that are not compatible with the portable objects already existing in the market, such as standard memory cards.

To overcome these drawbacks, modular portable sets, such as the one described in the patent document FR 88 13439 filed on 12 Oct. 1988, have been developed.

This patent document describes a portable set separated into two distinct elements, namely:

firstly, a standard electronic memory card, and secondly, a case capable of receiving the card in operational electronic contact. This case comprises transmission means capable of cooperating with homologous reception means of the terminal, power supply means and processing means capable of ensuring the exchange of data, at least from the card to the terminal.

In this way, the portable set constituted by the card, used in combination with the case, enables data to be exchanged with a terminal without physical contact. A portable set such as this has numerous applications: "hands free" identification for the checking of physical access, passage through the toll point without stopping.

Besides, without the case, the card is capable of all normal functions, for example bank-related functions, that are accessible to standard memory cards.

In the known embodiments of this system, the memory card used is a "standard" type of memory card. This means that when the card is in operational electrical contact with the case, the dialog between the card and the case should be set up according to a predetermined dialog protocol (in this case, the ISO 7816 protocol). This protocol requires an interface management which itself requires the presence of a microprocessor in the case. After the initialization of the exchange, by the sending of a request by the case, a two-way dialog can then be set up with the card, through the input/output (I/O) of this card, in accordance with the ISO 7816 protocol.

Through this modular system, the range of applications offered to the portable set is wide.

However, a problem of autonomy and consumption may be encountered in this type of device, owing to the fact, for example, that it is necessary to supply power to both the case and the memory card, and notably the microprocessor in each of these two elements that are capable of being coupled to each other.

Furthermore, the need to ensure that both the elements of the portable set (case +memory card) are smart (especially for the implementation of the protocol for the exchange of data between these two elements) implies a non-negligible degree of complexity and non-negligible manufacturing costs.

SUMMARY OF THE INVENTION

The invention is aimed notably at overcoming these drawbacks of the prior

More specifically, an aim of the invention is to provide a system for the exchange of data without physical contact between a terminal and a portable set, the portable set being constituted by two separate elements capable of being coupled: a transceiver device and a portable object (preferably a memory card), this system doing without a system for managing the interface between the transceiver device and the portable object that can be coupled to it.

Another aim of the invention is to provide a system such as this that reduces the consumption of energy by the portable set to the minimum, and hence increases its autonomy.

A complementary advantage of the invention is that it provides a system such as this that is simple to make and costs little.

The invention is also aimed at enabling the constituent elements of the portable set to be used (and separately too) for other functions, notably by coupling the memory card to a distinct transceiver device, transmitting for example according to another mode of remote transmission (RF links, infrared etc.).

These aims as well as others that shall appear here below are achieved, according to the invention, by means of a system for the exchange of data between, firstly, at least one portable set and, secondly, a terminal, wherein said data exchange takes place without physical contact between the portable set and the terminal, by means of a predetermined protocol for exchanges of data, said portable set and said terminal each comprising transceiver means controlled by means for the implementation and the management of said protocol, wherein said portable set is constituted:

firstly, by a transceiver device comprising said transceiver means of the portable set and means for coupling with a portable object;

secondly, a portable object comprising coupling means used to ensure a two-way transfer of data with at least two types of transfer devices and notably with said transceiver device, and programmable data processing means, made in the form of logic micro-structures, said transceiver device and said portable object being capable of being either separate or coupled to each other by means of said coupling means;

wherein the programmable data processing means of the portable object comprise:

means for the processing of the useful data elements exchanged between the portable set and the terminal;

said means for the management of the transmission/ reception protocol of said portable set;

means for the generation of transmission/reception commands intended for the transceiver means contained in the transceiver device, said command generation means being controlled by said protocol management means;

and wherein said portable object comprises means to recognize the type of the transfer device to which it is coupled through said coupling means.

The present invention is based on the idea that a solution can be found to the problem raised here above by countering the view that the card used in the portable set must be a standard electronic memory card programmed in a standard way.

As it happens, owing to the fact that the means for the management of the transmission/reception protocol of the portable set are located in the portable object, i.e. in the memory card, it is quite possible to do without any microprocessor in the transceiver device. In other words, according to the data exchange protocol, the transceiver device has no intelligence.

As compared with the prior art, the management of the protocol has therefore been transferred to the memory card, by a simple reprogramming of its processing means as shall be seen further below.

By contrast, the power supply means for the portable set are advantageously localized in the transceiver device. The memory card is therefore powered through its means for coupling with the transceiver device. Advantageously, this power supply is provided selectively only when the card is "activated" and hence only during exchanges of data. This fact reduces consumption and hence increases the autonomy of the portable set.

According to another characteristic advantage of the invention, the transceiver device includes means to connect and initialize the portable object under the control of activating means that generate an activating information element.

Advantageously, said activating means consist of either a hand-operated switch that can be pressed or operated by the user and/or means to watch for and detect the presence of the portable set in the working area of a terminal.

The latter case applies notably to the modes of use of the type implementing a group or population of terminals each having a predetermined and limited geographical working area, it being possible for the portable set to be located inside or outside the working area of each of said terminals.

Furthermore, it will be appropriate to limit the number of occasions when the user has to use the hand-operated switch, when there is such a switch, to save on the battery of the portable set.

For remote toll collection, the pressing of the hand-operated switch will thus be designed, for example, solely to confirm the user's assent to the debiting of his memory card.

According to another characteristic of the invention, the device includes means to detect the fact that said portable object is properly coupled, said detection means controlling means to inhibit said activating information so that said activating information is not generated when said portable object is not properly coupled to said transceiver device.

The activating information is thus inhibited when no memory card is coupled to the transceiver device or again when the electrical connection between these two elements is imperfect.

Advantageously, said activating information is generated when the portable set enters said working area. In this way, the memory card is supplied with power only once, when it enters the working area. When the exchange of data with the terminal is over, the card can no longer be supplied with power, unless the user leaves the area and enters it again.

It will have been noted that the portable object and the transceiver device exchange two types of data elements:

the portable object sends the transceiver device commands, i.e. instructions, intended inter alia to place the transceiver device in the transmitting configuration or in the receiving configuration respectively. The portable object can also send commands corresponding to ancillary functions of the transceiver device, notably functions of display or of status tests (for example the condition of the battery, presence in a geographical working area of a terminal, data elements entered by the user by means of a switch or a keyboard etc.);

furthermore, the portable object and the terminal exchange useful data elements with each other: these data elements travel in transit through the transceiver device.

For the processing of the commands received from the portable object, the transceiver device advantageously comprises simple means to decode these commands, constituted by simple logic circuits.

These commands may be transmitted to the transceiver device either through a wire distinct from the coupling means (for example an RFU or Reserved for Future Use contact) or through the same wire used for the transmission of useful data elements.

In the latter case, it is necessary provide for means to recognize the nature of the information elements that the transceiver device receives from the portable object, for example by preceding the commands with a specific header as shall be described here below with reference to a particular embodiment of the invention.

According to another characteristic of the invention, said data processing means of the portable object comprise:

first means for the exchange of data according to a first protocol to exchange data with a transfer device of a first type;

second means for the exchange of data according to a second protocol, through the transceiver means of the portable set which constitutes a transfer device of a second type, with said terminal; and means to select first and second data exchange means as a function of information element on the transfer device type provided by said means to recognize.

Advantageously, said first protocol is the ISO 7816-3 protocol, stipulating that the signal present in said data exchange wire of the coupling means should be in a high state after an initialization of said portable object, wherein said transceiver device, when it is coupled to said portable object, dictates a condition where the signal present in said data exchange wire of the coupling means should be in a low state for a first period of time after an initialization of said portable object, and wherein said recognition means determine a testing state equal to the state of the signal present in said data exchange wire of the coupling means after a second period of time, said second period of time being smaller than said first period of time, said information on the type of transfer device given by said recognition means indicating that the transfer device to which the portable object is coupled is:

either of the first type, if said testing state is a high state;

or of the second type, if said testing state is a low state.

Thus the memory card will operate according to the ISO 7816 protocol when it is coupled with a standard terminal, for example by the reloading or programming of this memory card and will, by contrast, place itself in a specific dialog configuration when it is coupled with a transceiver device of the type used in the invention.

In other words, the memory card works:

either in accordance with the standard ISO 7816-3, according to which the memory card is a peripheral slave of the transfer device which, in this case, is a standard reader;

or according to procedures adapted to a contact-free radio link, where the memory card is the master of the transfer device which, in this case, is the transceiver device into which it is inserted.

BRIEF DESCRIPTION OF THE DRAWINGS

Other features and advantages of the invention will appear from the following description of a preferred embodiment of the invention, given by way of a non-restrictive illustration, and from the appended drawings, of which.

Hereinafter in the description, reference shall be made to the context of remote payment in public transport systems but it is clear that the invention is not restricted to this particular application. The invention can be applied also to the checking of "hands free" physical access or to any other application requiring an exchange of data without physical contact.

MORE DETAILED DESCRIPTION

Figure 1:
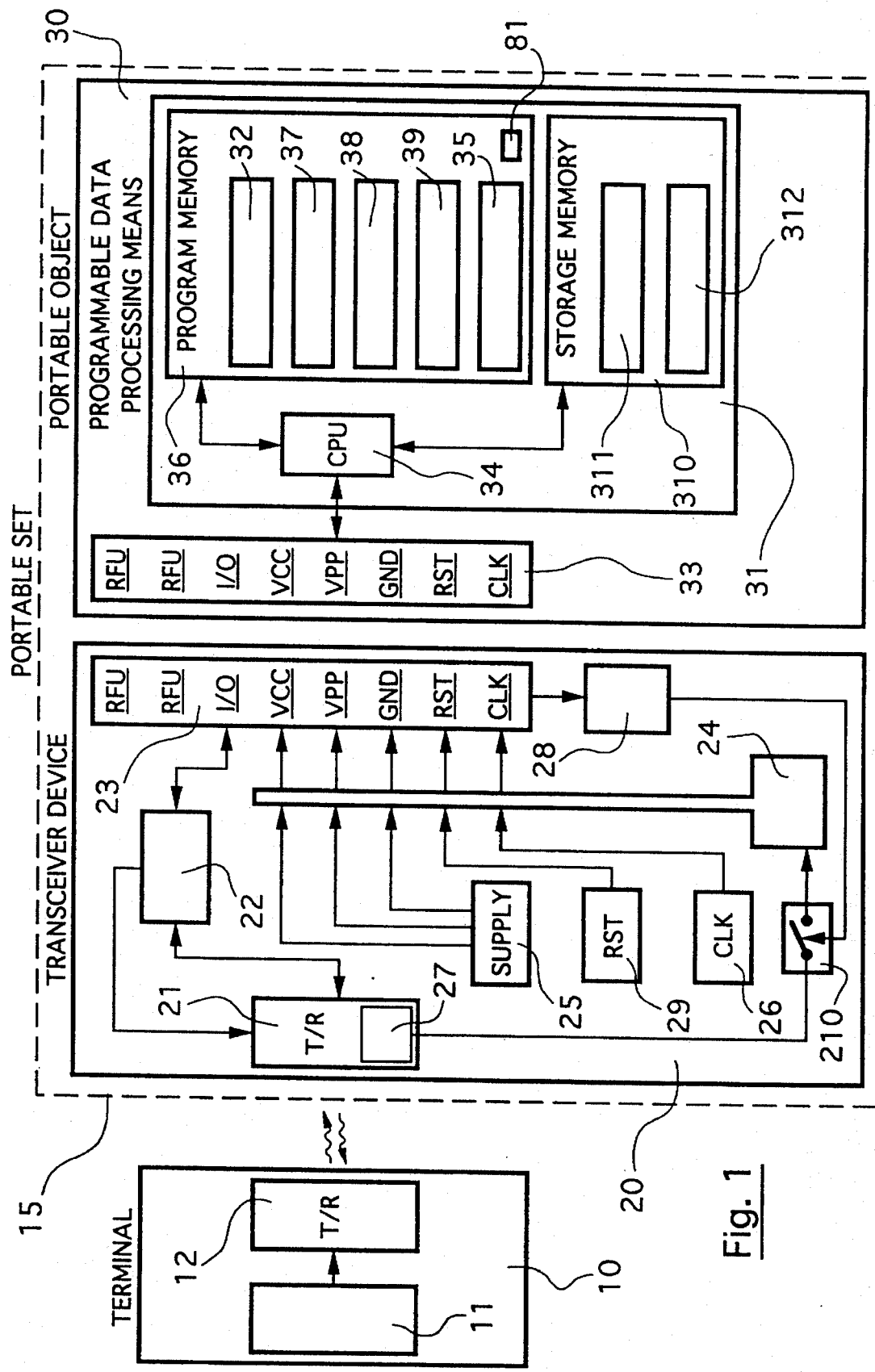
FIG. 1 is a simplified diagram showing the main functional modules of a system according to the invention, formed by a terminal and portable set with portable object and transceiver device capable of being coupled with each other.

FIG. 1 shows a simplified diagram of a data exchange system such as this, comprising firstly a terminal 10 and secondly a portable set 15. The portable set 15 is constituted by a transceiver device 20 and a portable object 30.

The terminal 10 comprises transceiver means 12, these transceiver means being controlled by means 11 to implement the protocol for the exchange of data between the terminal 10 and the portable set 15.

The transceiver device 20 comprises:

transceiver means 21 compatible with the transceiver means 12 located in the terminal 10. In the event of transmission by RF link, these transceiver means are essentially constituted by means for the modulation/ demodulation of the carrier frequency. It is possible notably to use transceiver means of the same type as those of the French patent No. 88 16672;

means 22 to decode commands sent by the portable object 30;

means 23 for coupling with the portable object 30;

means 24 for the connection, disconnection and initialization of the portable object 30;

means 25 for the supply of power to the portable set, constituted either by a battery or by remote power supply means; in the latter case, the portable set receives its supply of power through the signal transmitted by the terminal;

means 26 for the generation of a clock signal;

activating means 27 (watching for and detecting presence in a working area);

means 28 to detect the fact that the portable object is properly coupled;

means 29 to generate a signal for resetting the portable object 30.

The portable object 30 comprises programmable data processing means 31, a central unit 34, means 33 for coupling with the transceiver device, a program memory 36 and a storage memory 310.

The program memory 36 comprises:

means 38 for the processing of useful data exchanged between the portable set 15 and the terminal 10;

means 32 for the management of protocols including notably, on the one hand, the transmission/reception protocol of the portable set and, secondly, the protocol 150 enabling the memory card to communicate with a standard transfer device (standard reader);

means 37 for the generation of transmission/reception commands intended for the transceiver device 20, the command generating means 37 being controlled by the protocol management means 32;

means 39 for the processing of ancillary data coming directly from the transceiver device 20;

means 35 for recognizing the nature of the device 20;

means 81 for selecting one of the protocols.

The coupling means 23, 33 of the transceiver device 20 and the portable object 30 comprise eight contacts:

an input/output contact (I/0);

a high power supply contact (VPP);

a low power supply contact (VCC);

a ground contact (GND);

a clock contact (CLK)

a resetting contact (RST);

two RFU (Reserved for Future Use)contacts.

The high and low contacts as well as the ground contact are connected to the power supply means 25. The clock contact is connected to the clock generation means 26. The resetting contact is connected to the means for generating a resetting signal.

The portable object 30 controls the transceiver device by means of commands. These commands, sent out by the portable object 30, are decoded by the transceiver device 20 and enable it to get configured either in transmission mode or in reception mode. Another command enables the portable object 30 to turn itself off, by controlling the connection means 24. Finally, different test commands enable the portable object 30 to know that it is in a working geographical zone or to test the condition of the battery 25.

Figure 4:
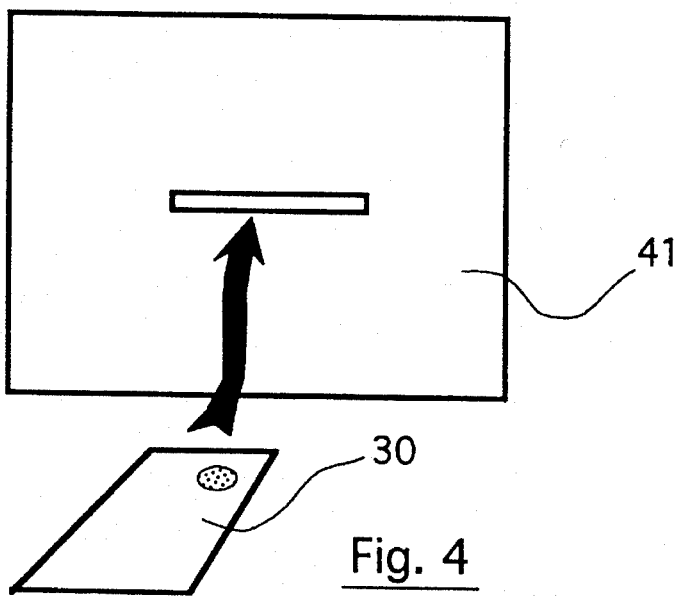
FIG. 4 shows an example of the working of the portable object of the system according to the invention with a first type of transfer device, namely a ISO 7813-3 reader.
Figure 5:
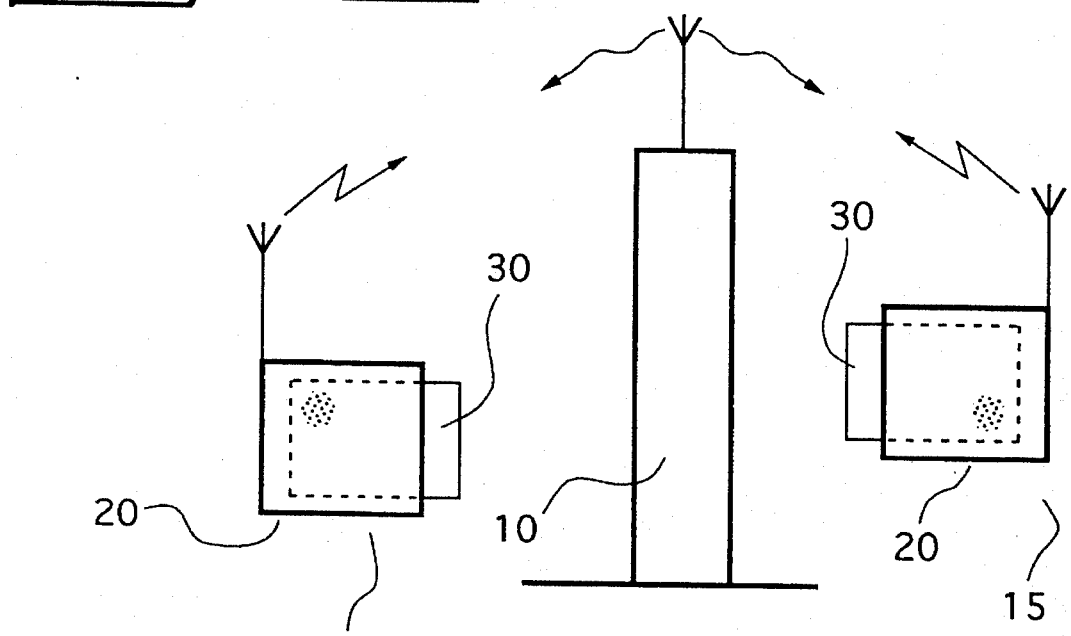
FIG. 5 shows an example of the working of the portable object of the system according to the invention with a second type of transfer device, namely a transceiver device of the system according to the invention.

As shown in relation with FIGS. 4 and 5, in the event of the implementation of a system according to the invention in a remote payment system, for example in a public transport system, the data exchange takes place as follows. The user possesses a memory card type of card 30 which he may load with credit units entitling him to obtain access to the transport system, accoupling his card 30 with an ISO reader (reference labelled 41 in FIG. 4). When he wishes to obtain access to the public transport system, he inserts his memory card 30 into the transceiver device 20 and keeps the portable set 15, constituted by the card 30 and the transmission/reception device 20, on his person, for example in one of his pockets.

In order to gain access to the public transport system, the user must pass close to a payment terminal 10 having a limited geographical working area. This terminal 10, using its transmission means 12, constantly sends out a signal to the portable sets 15 belonging to the different users.

If the user possessing a portable set 15 is actually located in this working area, then the activating means 27 located in the transceiver device 20 will connect and initialize the portable object 30 by means of the coupling means 23, 33. This connection step corresponds to a turning-on operation which consists in providing the portable object 30 with the high and low power supplies, the ground signal, the resetting signal and the clock signal.

After having been activated, the portable object 30 must recognize the type of device with which it is coupled. This device may be a transceiver device 20 according to the invention or any other type of reader 41, an ISO reader for example. This recognition step is presented with reference to FIGS. 6 and 7.

Figure 6:
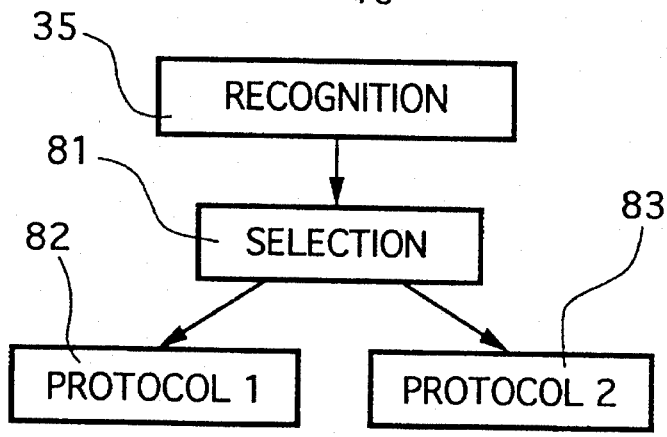
FIG. 6 is a block diagram used to explain the determining of the choice of one of the two modes of operation of the portable object according to the invention.

As shown in the block diagram of FIG. 6, the recognition means 35 (for recognizing the nature of the transfer device with which the memory card is coupled) give an element of information on the type of transfer device to the means 81 for selecting one of the two protocols 82, 83 managed by the management means 32.

Hereinafter in the description, the memory card will be considered to operate:

either according to the protocol ISO 7816-3 when it is connected to a standard ISO reader and constitutes a peripheral enslaved to this reader;

or according to a radio protocol, when it is connected to a transceiver device according to the invention and is the master of this transceiver device.

Figure 7:
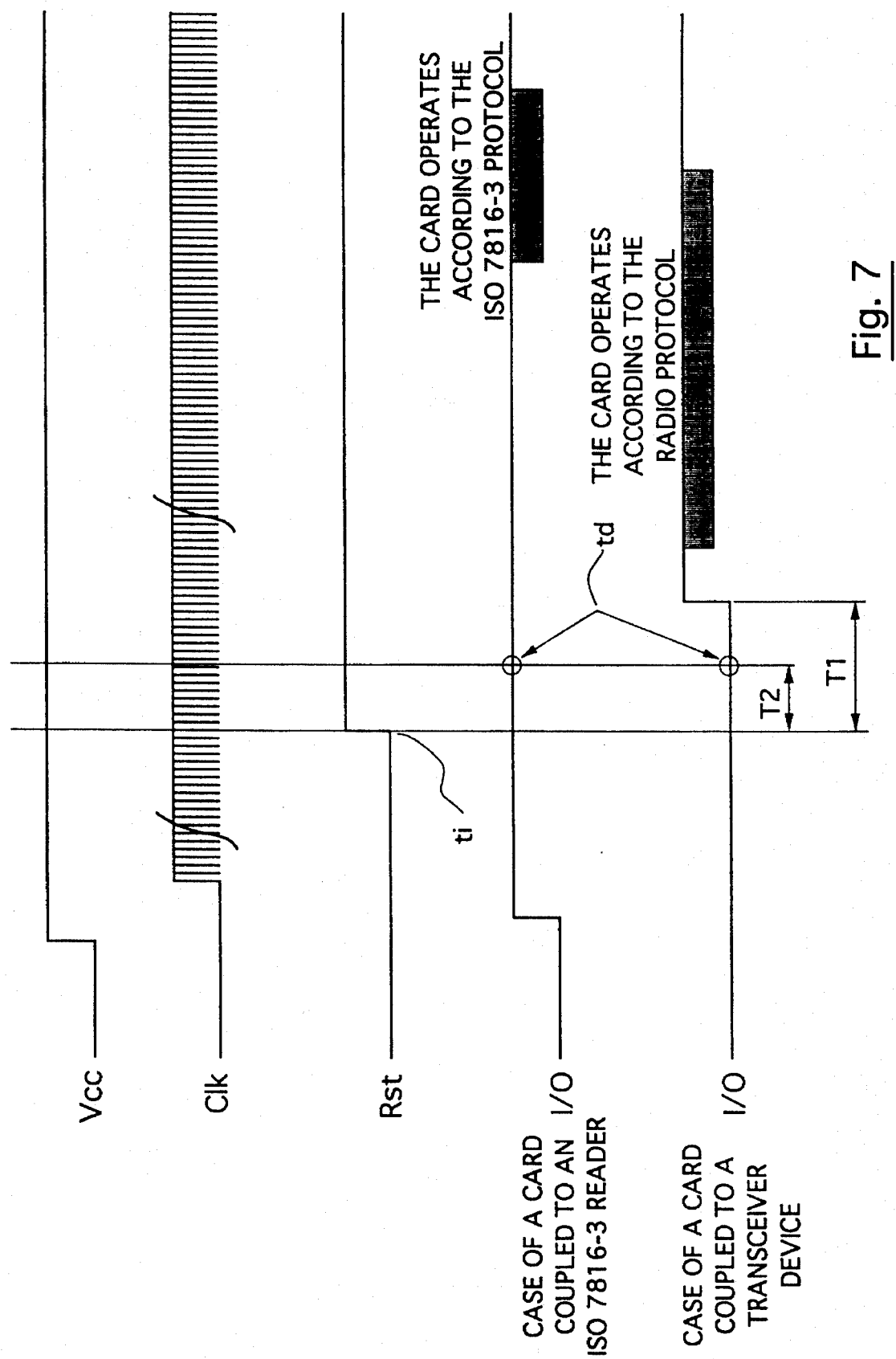
FIG. 7 presents timing diagrams used to explain the working of the means for recognizing the type of transfer device with which the memory card is coupled.

FIG. 7 shows timing diagrams of the following signals:

low power supply VCC signal;

clock signal CLK;

resetting signal RST; and input/output signal:

* when the card is coupled to an ISO 7816-3 reader;

* when the card is coupled to a transceiver device.

Should the card be coupled to an ISO reader, the protocol 7816-3 stipulates that the I/O signal should be equal to the high state after initialization of the card (instant $t_i$).

On the contrary, should the card be coupled to a transceiver device according to the invention, the I/O signal is in the low state for a period of time T1 following the instant $t_i$.

The principle implemented in the invention consists in scrutinizing the value of the signal present at the input/output (I/O) contact at an instant $t_d$ of decision on the mode of operation, after a duration T2 following the instant $t_i$, T2 being smaller than T1. If the I/O signal takes the value "1", the device is an ISO reader; if not, the device is a transceiver device 20.

If the portable object is actually coupled to a transceiver device 20, the exchange of data with the terminal 10 can start according to a predetermined protocol. Thus, according to a preferred exchange protocol, as soon as it is activated, the memory card 30 must configure the transceiver device 20 in reception mode. To this end, the memory card 30 sends the transceiver device a command for it to be configured in reception mode. The transceiver device 20 decodes this command and then configures its transceiver means 21 in reception mode. This enables it to receive the first data elements sent out by the remote terminal 10. Then, before sending a response to the terminal 1.0, the memory card 30 must configure the transceiver device 20 in transmission mode by sending the appropriate command to the transceiver device 20. The memory card 30 then sends the response data elements according to the data exchange protocol to be implemented, and then reconfigures the transceiver device 20 in reception mode so as to be able to receive the next request/response from the terminal 10.

Advantageously, the first data elements exchanged between the terminal 10 and the card 30 are information elements relating to physical identification.

The exchange of data between the terminal 10 and the memory card 30 then continues in the same way, depending on the number of steps required in the protocol.

When the data exchange is over, i.e. when the memory card has been debited in this specific example, the memory card sends a command to the transceiver device so it is disconnected and hence so that power is saved.

Furthermore, the memory card 30 can no longer be connected to the transceiver device unless the user leaves the working area. In fact, it is entry into the area that activates the memory card 30 and not just presence in the area. Thus, it is physically ensured that the card can be debited only once.

Depending on whether the memory card 30 sends data elements or commands to the transceiver device 20, the programmable data processing means, built around a microprocessor, use data elements or commands stored in a memory 37 of this very same microprocessor.

When the user has used all the transport credit units stored in his memory card, he can reload it. The operation of loading and reloading a card with transport credit units corresponding to single tickets or season tickets can be done on a standard card reader using an ISO 7816 data exchange protocol. Furthermore, it is possible to conceive of a situation where the same memory card is used also for other electronic wallet type applications. The memory card recognizes the nature of the device with which it is coupled through recognition means 35, the working of which has been explained here above.

The means 28 used to detect that the memory card 30 is properly coupled with the transceiver device 20 control the means 210 for inhibiting the activating information in such a way that the activating information is not generated when the memory card 30 is not properly coupled to the transceiver device 20.

Figure 2:
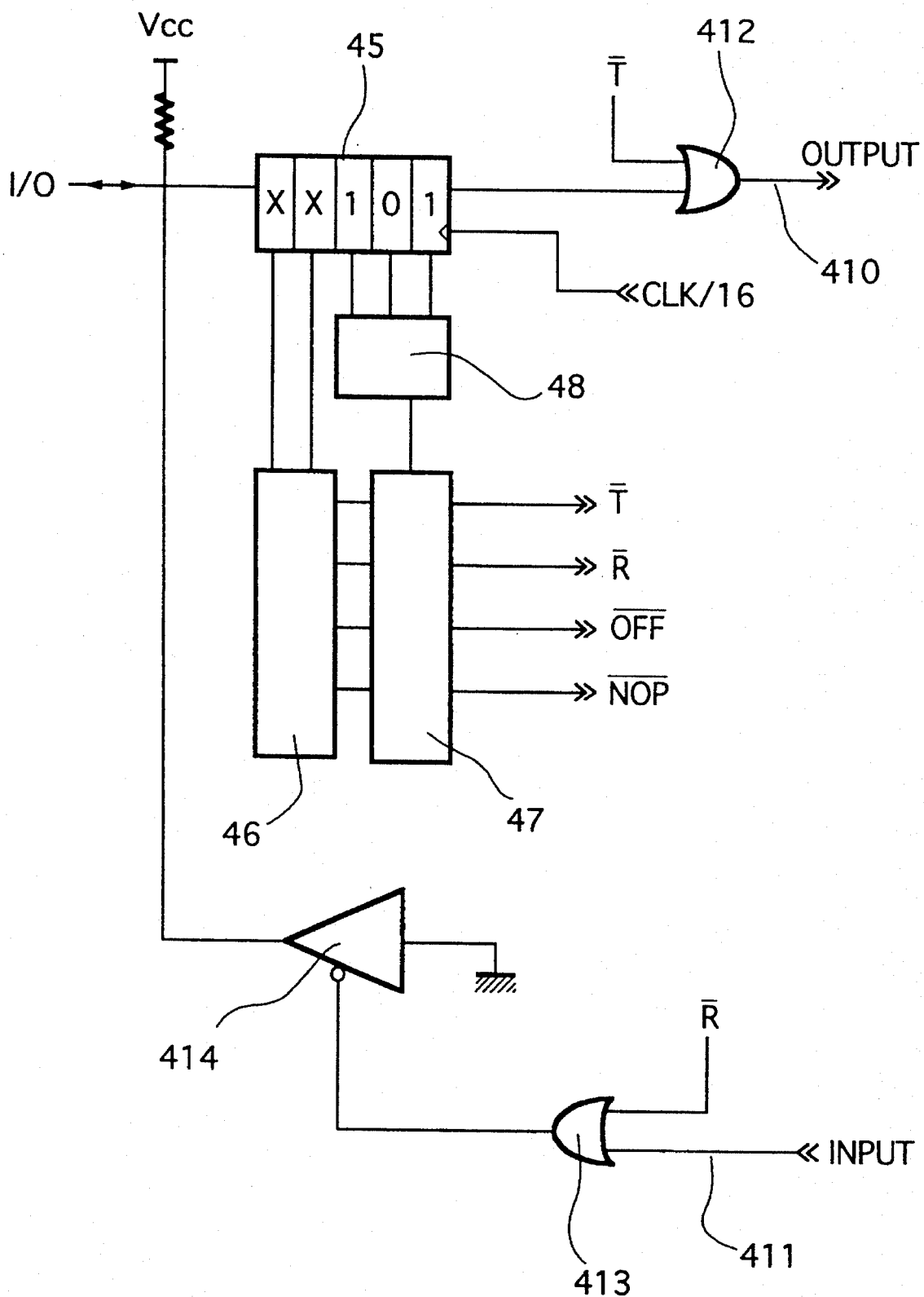
FIG. 2 is a logic diagram of a preferred embodiment of the decoding means located in the transceiver device for the decoding of the transmission/reception commands received from the portable object, when the commands and the data elements are sent on a single wire.

FIG. 2 is a logic diagram of a first embodiment of the decoding means located in the transceiver device. This first embodiment corresponds to a decoding of the transceiver commands received from the portable object, should the commands and the data elements be transmitted on a single wire. This single wire corresponds to the input/output (I/O) contacts of the transceiver device 20 and of the portable object (i.e. the memory card 30). Through this single wire, the memory card can send either commands intended for the transceiver device or data elements intended for the terminal.

So that the transceiver device recognizes the commands sent out by the memory card, the card sends out the data elements and the commands at two different speeds. The data elements are exchanged according to a half-synchronous mode and at a first speed. The card transmits its commands to the transceiver device according to a synchronous mode, which is possible since the card and the transceiver device share the same clock signal (CLK), and at a second speed of transmission which is far swifter than the first speed.

The shift register 45 receives a clock signal (CLK/16) corresponding to the speed of transmission of the commands.

These commands are structured as command or instruction words. Each command word comprises:

a header constituted by a sequence of binary characters or bits having at least two state transitions;

at least one command bit, each value taken by the command bit or bits corresponding to a particular command.

In the case of FIG. 2, the header is constituted by three bits (101), the commands themselves being encoded on two bits, thus enabling the encoding of four different commands.

A command sent out by the memory card to the transceiver device is transmitted in series by the input/output wire (I/O) towards a shift register 45. The decoding then takes places as follows.

A command decoding module, properly speaking, recognizes the command actually sent by the memory card from among the four possible combinations of the first two bits of the shift register 45.

Furthermore, the other three bits of the shift register 45 are permanently scrutinized by command validation means 48 when the value of these three bits corresponds to the binary sequence 101, i.e. when these three bits correspond to a command word header, the command validation means 48 activate command memorizing means 47. Thereupon, the command memorizing means 47 deliver an active signal in a low state at one of the four outputs, each output corresponding to one of the four possible commands.

In this example, the four possible commands are:

the two commands for the configuration of the transceiver means of the device in transmission mode and reception mode respectively (these commands being T/and R/:respectively);

a command designed to disconnect the memory card from the transceiver device (OFF/);

a command generating no operation (NOP/).

Those skilled in the art can easily extend the scope of the invention from this example in which each command is encoded on two bits to other examples where the commands are encoded on more than two bits and are therefore greater in number.

In particular, it is possible to think of many commands that can be used, for example, to test the state of the battery, indicate presence in a working area or read other registers connected to a keyboard or to a display screen.

The memory card also sends out data elements to terminals through the transceiver device. This data transmission step must be preceded by a step consisting in the sending of a command word so as to configure the transceiver means in transmission mode.

The data elements are structured as data words, each data word comprising a starting bit, data bits, a parity bit and an end-of-word bit.

Since the speed of transmission of the commands is far greater than the speed of transmission of the data, and since the shifting of the register 45 is done at a speed identical to that of the transmission of the commands, the data words are not confused with the control words. Indeed, the binary sequence corresponding to the header of a control word (101 in our example) can never occur in the last three bits of the shift register. Even if the binary sequence of the control header (101) is in the binary train of data elements, this sequence will not be reproduced identically in the shift register 45. Owing to the difference between the speed of transmission of the data and the shifting speed of the shift register 45, a data bit will be reproduced several times in the register. For example, if there is a ratio of two between the two speeds, a binary sequence of data elements 101 will be in the form 11011 in the shift register 45.

Since the transceiver device is configured in transmission mode, the data words travel in transit through the input/output wire (I/O), then through the shift register 45 before reaching the transmission output (OUTPUT) 410. This output (OUTPUT) 410 is inactive in the high state. The selection of the output line consists simply in performing an "OR" operation (412) between the command (T/) and the output of the shift register 45. Thus the output line (OUTPUT) 410 is in the high state, except when the command T/is in the low state. In the latter case, the state of the output line (OUTPUT) 410 corresponds to the binary train coming out of the shift register 45. The passage through the shift register 45 is transparent for the data elements, until the reception of a new command.

The memory card sends out commands or data elements but can also receive data elements coming from the terminal.

The memory card can effectively receive data elements only if it has previously configured the transceiver means in reception mode, by sending the appropriate command to the transceiver device.

The transceiver means receive the data elements coming from the terminal (INPUT). Like the output line (OUTPUT) 410, the input line (INPUT) 411 is connected to the input of an "OR" gate 413, the other input corresponding to the command R/.

When the transceiver device is configured in reception mode (command R/in the low state), the output of the "OR" gate corresponds to the input signal (INPUT) 411.

The input/output wire (I/O) is shared between transmission and reception by means of a standard assembly, comprising a three-state output buffer 414. The control of this buffer 414 is connected to the output of the "OR" gate 413 and its input is always in the low state. Thus, when a data bit with a value of "0" is received, it commands the buffer 414 in such a way that its output is equal to its input, namely 0 since this input is connected to the ground. The I/O wire receives this value "0". By contrast, when a data bit with a value "1" is received, it commands the buffer 414 in such a way that its output is at high impedance. The I/O wire then receives the value "1", owing to the pull-up resistor connected to the supply VCC.

Figure 3A:
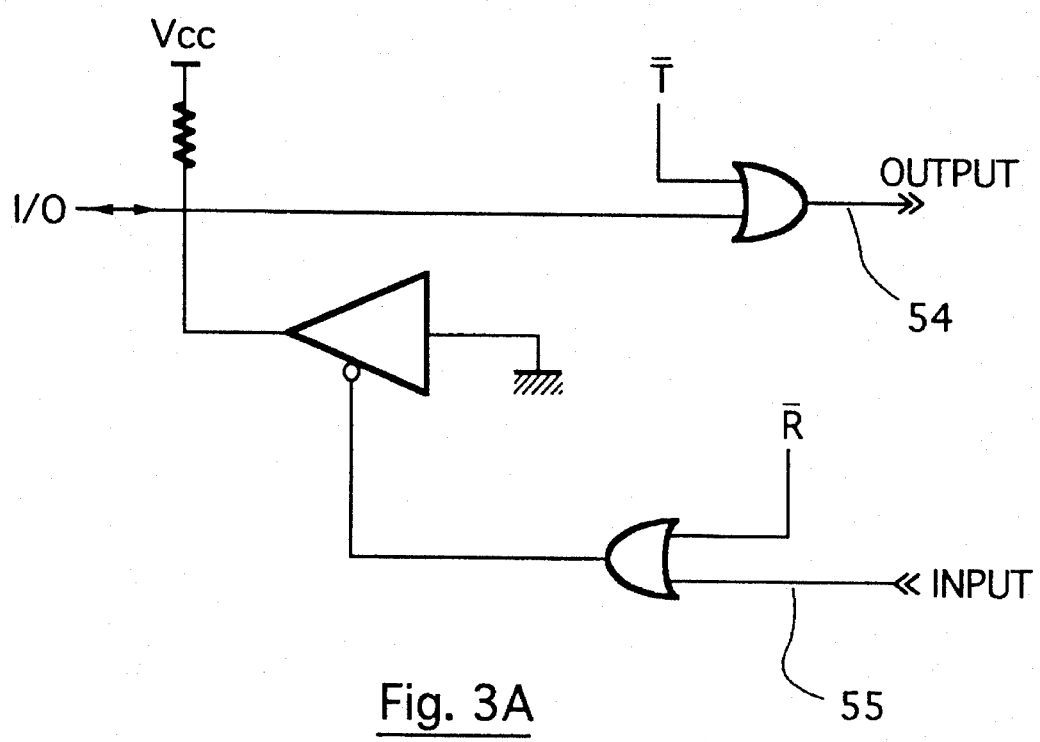
FIGS. 3A, 3B are logic diagrams for the decoding of the data elements and of the commands received by the transceiver device from the portable object, when the transceiver commands and the useful data elements are transmitted on two different wires.
Figure 3B:
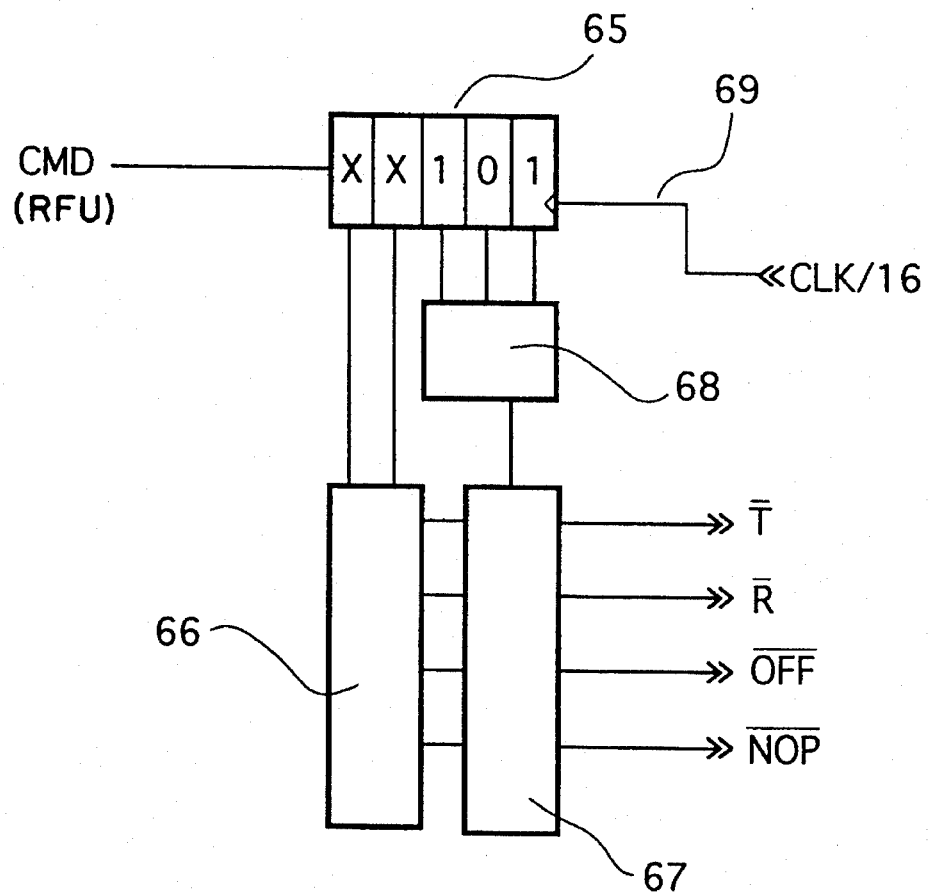

FIGS. 3A and 3B show data decoding logic diagrams when the transmission/reception commands and the useful data elements are transmitted on two different wires.

FIG. 3B corresponds to the decoding of commands properly speaking. The commands are sent out by the memory card on a wire reserved for commands (CMD). This wire corresponds to one of the RFU (Reserved for Future Use) contacts. The decoding means are identical to those explained with reference to FIG. 2, i.e. they comprise a shift register 65, command validation means 68, command decoding means 66 and command memorizing means 67. These command memorizing means 67 have four output corresponding respectively to the four types of commands that exist in our example (T/, R/, OFF/, NOP/). The shift register is controlled by a clock signal 69. As in the example presented with reference to FIG. 2, the card transmits these commands to the transceiver device synchronously, which is possible since the memory card and the transceiver device share the same clock (CLK). The speed of communication is, for example, fixed at CLK/16. This speed corresponds to the maximum bit rate of the memory card.

In particular, the command signals (T/and R/) corresponding to the configuration of the transceiver device in transmission and reception mode respectively control logic circuits as shown in FIG. 3A. In this embodiment, the data elements to be sent to the terminal are conveyed solely by the input/output wire (I/O). If the transceiver device is actually configured in transmission mode, i.e. if the signal T/is active, then the data elements are sent out on the output (OUTPUT) 54.

Similarly, when the terminal wishes to send data words to the memory card, the transceiver device must be configured in reception mode, i.e. the signal R/must be active. The data words coming from the terminal (INPUT 55) may then be transmitted to the memory card through the input/output wire I/O.

What is claimed is:

1. A system for the exchange of data between, firstly, at least one portable set and, secondly, a terminal, wherein said data exchange takes place without physical contact between the portable set and the terminal, by means of a predetermined protocol for exchanges of data, said portable set and said terminal each comprising transceiver means controlled by means for the implementation and the management of said protocol, wherein said portable set is constituted:

firstly, by a transceiver device comprising said transceiver means of the portable set and means for coupling with a portable object;

secondly, a portable object comprising coupling means used to ensure a two-way transfer of data with at least two types of transfer devices and notably with said transceiver device, and programmable data processing means, made in the form of logic microstructures;

said transceiver device and said portable object being capable of being either separate or coupled to each other by means of said coupling means;

wherein the programmable data processing means of the portable object comprise:

means for the processing of the useful data elements exchanged between the portable set and the terminal;

said means for the management of the transmission/reception protocol of said portable set;

means for the generation of transmission/reception commands intended for the transceiver means contained in the transceiver device, said command generation means being controlled by said protocol management means;

wherein said portable object comprises means to recognize the type of the transfer device to which it is coupled through said coupling means;

wherein said data processing means of the portable object comprise:

first means for the exchange of data according to a first protocol to exchange data with a transfer device of a first type;

second means for the exchange of data according to a second protocol, through the transceiver means of the portable set which constitutes a transfer device of a second type, with said terminal; and means to select first and second data exchange means as a function of an information element on the transfer device type provided by said means to recognize;

wherein said first protocol is the ISO 7816-3 protocol, stipulating that the signal present in said exchange wire of the coupling means should be in a high state after an initialization of said portable object;

wherein said transceiver device, when it is coupled to said portable object, dictates a condition where the signal present in said data exchange wire of the coupling means should be in a low state for a first period of time after an initialization of said portable object; and wherein said recognition means determine a testing state equal to the state of the signal present in said data exchange wire of the coupling means after a second period of time, said second period of time being smaller than said first period of time, said information on the type of transfer device given by said recognition means indicating that the transfer device to which the portable object is coupled is:
either of the first type, if said testing state is a high state;
or of the second type, if said testing state is a low state.

2. A system according to claim 1, wherein the transceiver device includes means to connect and initialize the portable object under the control of activating means that generate an activating information element.

3. A system according to claim 2, of the type comprising at least one terminal having a predetermined and limited geographical working area, it being possible for the portable set to be located inside or outside said area, wherein said activating means are constituted by means to watch for and detect the presence of the portable set in said area.

4. A system according to claim 3, wherein said activating information element is generated at the entry of the portable set into said area.

5. A system according to claim 3, wherein said activating means are constituted by a hand-operated switch that can be operated by the user.

6. A system according to claim 2, wherein said transceiver device comprises means to detect the fact that said portable object is properly coupled, said detection means controlling means to inhibit said activating information so that said activating information is not generated when said portable object is not properly coupled to said transceiver device.

7. A system according to claim 1, wherein said data elements to be transmitted and said transmission/reception commands are exchanged between the portable object and the transceiver device through a single wire of the coupling means.

8. A system according to claim 1, wherein said useful data elements are exchanged between the portable object and the transceiver device through a wire distinct from the wire for the transmission of said transmission/reception commands.

9. A system according to claim 1, wherein the means for the power supply to the portable set are localized in said transceiver device, the portable object being supplied with power through said coupling means.

10. A system according to claim 1, wherein said transceiver device comprises means for the decoding of said transmission/reception commands, said decoding means being constituted by logic circuits.

11. A system according to claim 1, wherein said data exchange without physical contact is done by means of a mode of transmission belonging to the group comprising transmission by RF links and infrared transmission.

12. A system according to claim 1, wherein said data elements are structured as data words, framed by a starting bit and a detection and/or error-correction bit, and an end-of-word bit.

13. A system according to claim 1, wherein said commands are structured as command words, each of said command words comprising:
a header constituted by a sequence of bits;
at least one command bit, each value taken by the command bit or bits corresponding to one of said commands.

14. A system according to claim 1, wherein said commands belong to the group comprising:
command for the configuration of the transceiver means of the transceiver device in transmission mode;
command for the configuration of the transceiver means of the transceiver device in reception mode;
command for the connection, disconnection and initialization of the portable object;
command to test for the presence of the portable set in the geographical working area;
command to test the power supply means.

15. A portable set for contactless exchange of data with a transfer device of a type such as a terminal by means of a predetermined protocol for exchanges of data, said portable set and said terminal each comprising transceiver means controlled by protocol managing means, wherein said portable set comprises:
a transceiver comprising the transceiver means of said portable set and means for coupling with a card;
a card comprising:
coupling means to enable two-way transfer of data with at least two different types of transfer devices, data transfer with one of said types including data transfer to and from the terminal by coupling said card to said transceiver and data transfer with another of said types including data transfer without coupling to said transceiver; and
programmable data processing means in the form of logic microstructures;
said transceiver and said card being separably coupled to each other by said coupling means;
wherein said card includes means to recognize the type of transfer device to which said card is coupled through said coupling means and wherein said programmable data processing means of said card comprises:
first means for exchanging data with a transfer device of a first type, without using said transceiver, according to a first protocol;
second means for exchanging data with a transfer device of a second type such as the terminal, according to a second, different protocol through said transceiver, said second means for exchanging data including said protocol managing means of said portable set;
means for processing useful data elements exchanged between said portable set and the terminal;
means for management of said portable set; and
means for generating transmission/reception commands for the transceiver means of said transceiver, said command generation means being controlled by said protocol management means; and
means to select first and second data exchange means, controlled by said means to recognize;
wherein said means to recognize determines a testing state responsive to a data exchange signal after a lapsed period of time, said testing state indicating the transfer device to which the card is coupled.

16. A portable set according to claim 15, wherein said transceiver comprises means for decoding said transmission/reception commands, said decoding means comprising logic circuits including essentially no software means.

17. A portable set according to claim 15, wherein said data are arranged as data words framed by a start bit and a detection and/or error-correction bit, and an end-of-word bit.

18. A portable set according to claim 15, wherein said transmission/reception commands are arranged as command words, each of said command words comprising a header using a sequence of bits, and at least one command bit, each value taken by said command bit or bits corresponding to one of said commands.

19. A portable set according to claim 15, wherein said commands comprise:
- a command for configuration of said transceiver in transmission mode;
- a command for configuration of said transceiver in reception mode;
- a command for connection, disconnection and initialization of said card;
- a command for testing the presence of said portable set in a geographical working area; and
- a command for testing power supply means.

20. A portable set according to claim 15, wherein said first protocol is a ISO 7816-3 protocol, stipulating that a signal present on a data exchange wire of said coupling means is in a high state after initializing said card,
- wherein said transceiver, when coupled to said card, dictates a condition where said signal present on said data exchange wire of said coupling means is in a low state for a first period of time after said initialization; and
- wherein said recognition means determines a testing state equal to the state of said signal present on said data exchange wire of said coupling means after a second period of time, said second period of time being shorter than said first period of time, said recognition means indicating that the transfer device to which said card is coupled is either of said first type, if said testing state is a high state, or of said second type, if said testing state is a low state.

21. A portable set according to claim 15, wherein said transceiver includes means for connecting and initializing said card under control of wake-up means that generate a wake-up signal.

22. A portable set according to claim 21, for exchanging data with at least one terminal located within a predetermined and limited geographical working area, it being possible for said portable set to be located within or outside said area, wherein said wake-up means includes means for watching for and detecting the presence of said portable set in said area.

23. A portable set according to claim 22, wherein said wake-up signal is generated upon entry of said portable set into said area.

24. A portable set according to claim 21, wherein said wake-up means includes a hand-operated switch operable by a user.

25. A portable set according to claim 21, wherein said transceiver comprises detection means to detect proper coupling with said card, said detection means controlling means for inhibiting said wake-up signal so that said wake-up signal is not generated when said card is not properly coupled to said transceiver.

26. A portable set according to claim 15, wherein data to be exchanged and said transmission/reception commands are exchanged between said card and said transceiver through a single wire of said coupling means.

27. A portable set according to claim 15, wherein data are exchanged between said card and said transceiver through a first wire different from a second wire for transmission of said transmission/reception commands.

28. A portable set according to claim 15, wherein means for supplying power to said portable set is located in said transceiver, said card being supplied with power through said coupling means.

29. A portable set for contactless exchange of data with a transfer device of a type such as a terminal by means of a predetermined protocol for exchanges of data, said portable set and said terminal each comprising transceiver means controlled by protocol managing means, wherein said portable set comprises:
- a transceiver comprising the transceiver means of said portable set and means for coupling with a card;
- a card comprising:
  - coupling means to enable two-way transfer of data with at least two different types of transfer devices, data transfer with one of said types including data transfer without coupling to said transceiver and data transfer with another of said types including data transfer to and from the terminal by coupling said card to said transceiver; and
  - programmable data processing means in the form of logic microstructures;
- said transceiver and said card being separably coupled to each other by said coupling means;
- wherein said card includes means to recognize the type of transfer device to which said card is coupled through said coupling means and wherein said programmable data processing means of said card comprises:
  - first means for exchanging data with a transfer device of a first type according to a first protocol, said first protocol being said an ISO 7816-3 protocol, stipulating that a signal present on a data exchange wire of said coupling means should be in a high state after an initialization of said card;
  - second means for exchanging data with a transfer device of a second type such as the terminal, according to a second, different protocol through said transceiver coupled to said card, said second protocol dictating a condition where said signal present on said data exchange wire of said coupling means be in a low state for a first period of time after said initialization, said second means for exchanging data including said protocol managing means of said portable set;
  - means for processing useful data elements exchanged between said portable set and the terminal;
  - means for management of said of said portable set; and
  - means for generating transmission/reception commands for the transceiver means of said transceiver, said command generation means being controlled by said protocol management means; and
  - means to select first and second data exchange means, controlled by said recognition means,
- and wherein said recognition means determines a testing state equal to the state of said signal present on said data exchange wire of said coupling means after a second period of time, said second period of time being shorter than said first period of time, said recognition means indicating that the transfer device to which said card is coupled is either of said first type, if said testing state is a high state, or of said second type, if said testing state is a low state.

* * * * *